United States Patent
Bernardi et al.

(10) Patent No.: US 10,427,230 B2
(45) Date of Patent: Oct. 1, 2019

(54) DUAL INTERFACE FOR OSCILLATING BLADES

(71) Applicant: Robert Bosch Tool Corporation, Broadview, IL (US)

(72) Inventors: Walter Bernardi, Highland Park, IL (US); Arvind Gopi, Prospect Heights, IL (US); Saad Alam, Franklin Park, IL (US)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 15/478,931

(22) Filed: Apr. 4, 2017

(65) Prior Publication Data

US 2017/0291238 A1    Oct. 12, 2017

Related U.S. Application Data

(60) Provisional application No. 62/320,315, filed on Apr. 8, 2016.

(51) Int. Cl.
| | | |
|---|---|---|
| *B23D 61/00* | (2006.01) | |
| *B27B 19/00* | (2006.01) | |
| *B24B 23/04* | (2006.01) | |
| *B23D 61/12* | (2006.01) | |

(52) U.S. Cl.
CPC ......... *B23D 61/006* (2013.01); *B23D 61/123* (2013.01); *B24B 23/04* (2013.01); *B27B 19/006* (2013.01)

(58) Field of Classification Search
CPC .... B23D 61/006; B23D 61/123; B24B 23/04; B27B 19/006

USPC ........................................................... D8/70
See application file for complete search history.

(56) References Cited

U.S. PATENT DOCUMENTS

| | | | | |
|---|---|---|---|---|
| 4,617,930 A | * | 10/1986 | Saunders ............. | A61B 17/142 |
| | | | | 30/166.3 |
| D817,127 S | * | 5/2018 | Gopi ............................... | D8/20 |
| 2014/0017000 A1 | | 1/2014 | Kaye, Jr. et al. | |

FOREIGN PATENT DOCUMENTS

| | | |
|---|---|---|
| DE | 102012203754 A1 | 9/2013 |
| EP | 1882538 A2 | 1/2008 |

OTHER PUBLICATIONS

Machine translation of DE 102012203754, Sep. 2013.*
International Search Report dated Jun. 16, 2017, of the corresponding International Application PCT/EP2017/056612 filed Mar. 21, 2017.

* cited by examiner

*Primary Examiner* — Stephen Choi
(74) *Attorney, Agent, or Firm* — Gerard Messina

(57) ABSTRACT

A blade for oscillating tools includes lateral edges, a working edge that extends in a first direction, and a mounting portion. The mounting portion includes a first mounting configuration that defines a first center and a second mounting configuration that defines a second center, where the first center is spaced a distance away from the second center in a direction that is substantially orthogonal to the first direction in which the working edge extends or to a tangent of a center of curvature of the working edge. Both mounting configurations are configured to drive the same working edge.

27 Claims, 9 Drawing Sheets

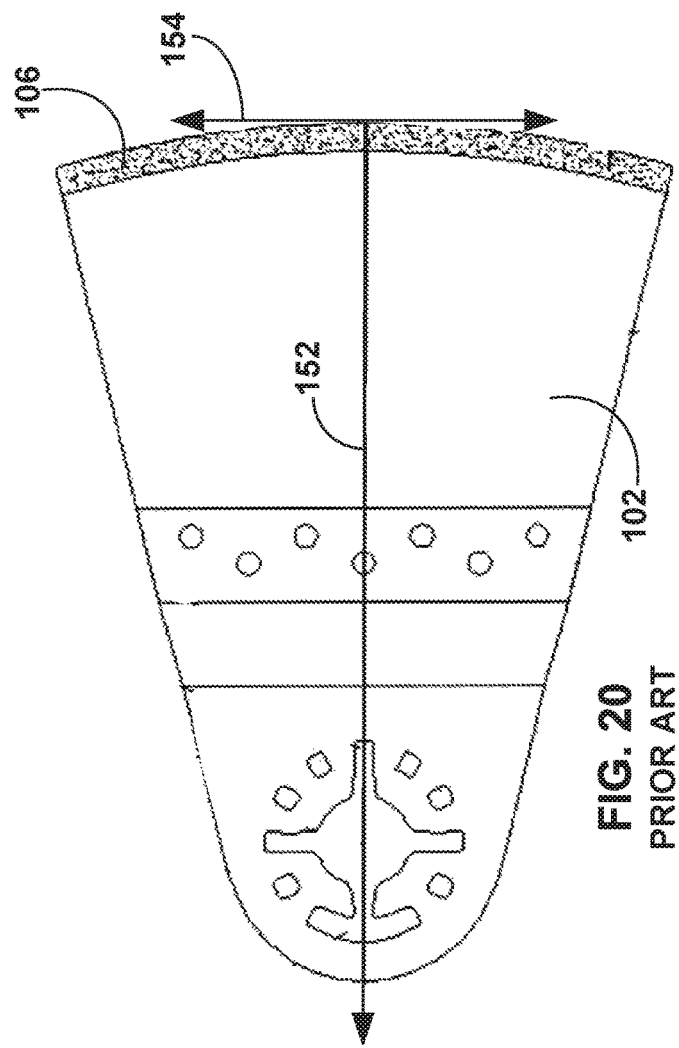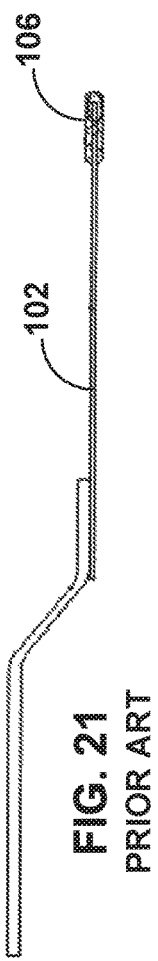
FIG. 20
PRIOR ART
FIG. 21
PRIOR ART

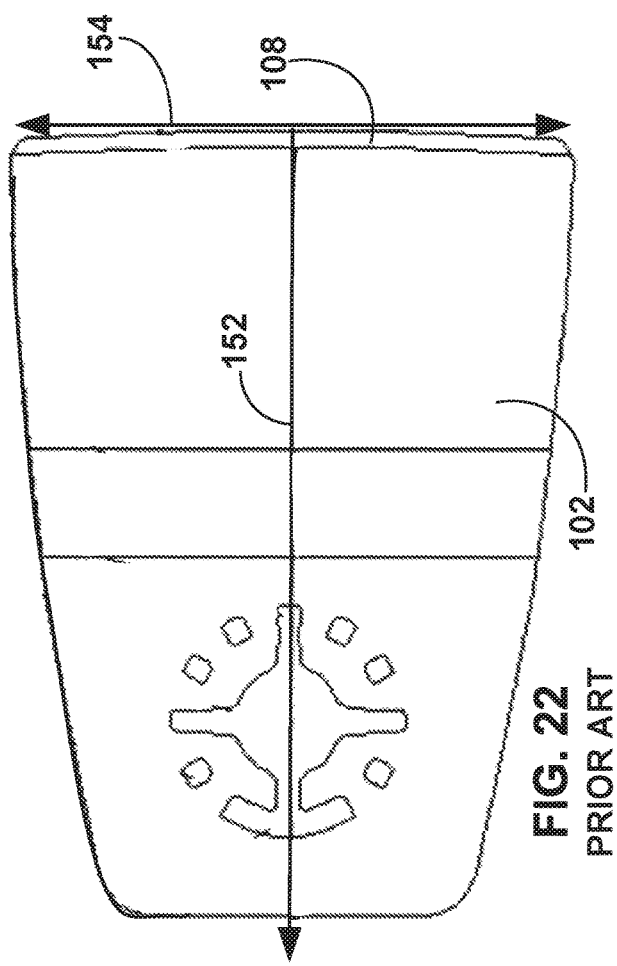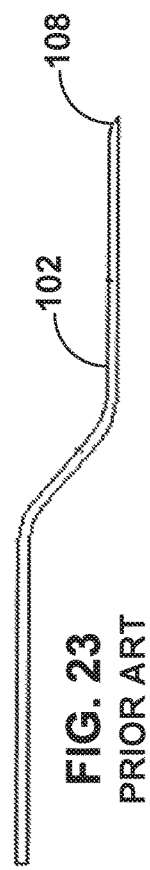
FIG. 22
PRIOR ART
FIG. 23
PRIOR ART

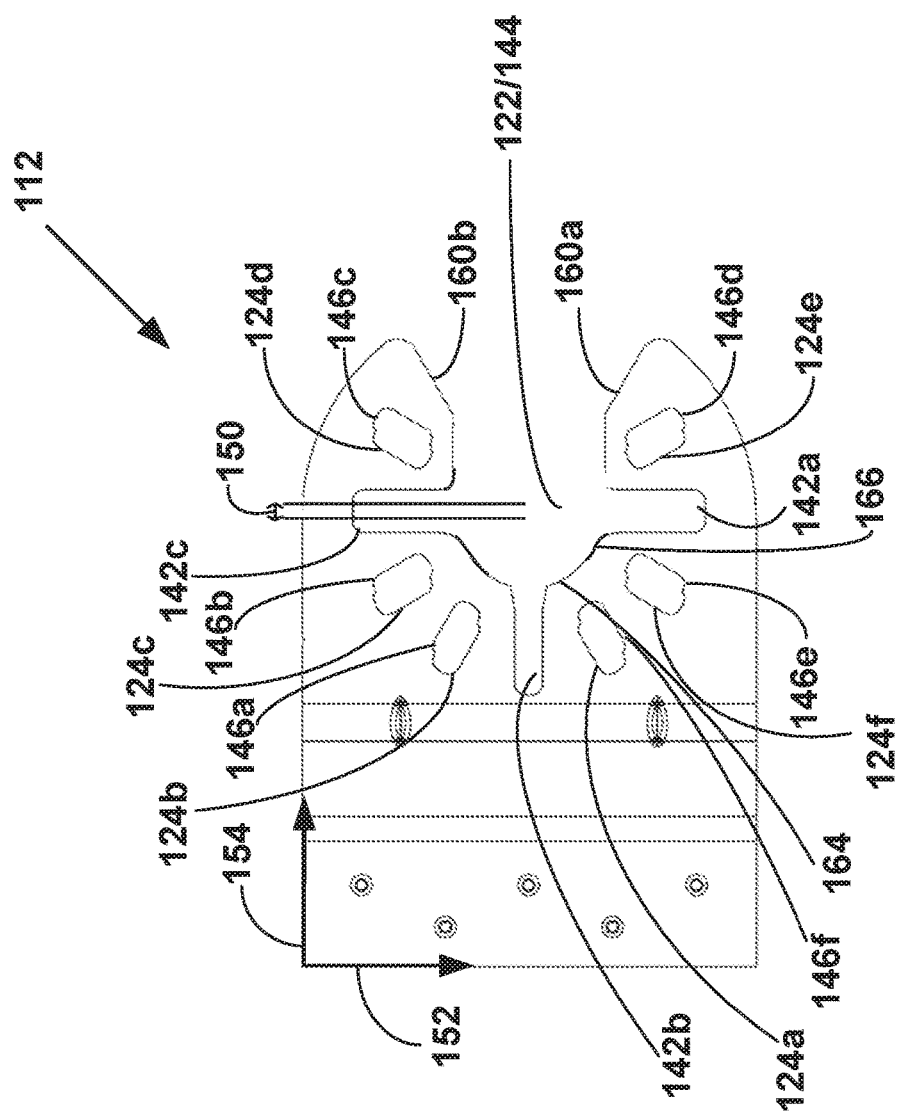

DUAL INTERFACE FOR OSCILLATING BLADES

CROSS-REFERENCE TO RELATED APPLICATION

This application claims the benefit, under 35 U.S.C. § 119(e), of U.S. Provisional Patent Application Ser. No. 62/320,315, filed Apr. 8, 2016, the content of which is hereby incorporated herein by reference in its entirety.

FIELD OF THE INVENTION

The present invention relates to accessories (such as cutting tools, saw blades, and sanding tools) for oscillating power tools.

BACKGROUND

Oscillating power tools generally have a motor, an output shaft, and a transmission that connects the motor to the output shaft and converts rotary motion of the motor to oscillating motion of the output shaft. The output shaft is coupled to an accessory attachment mechanism that is used to removably attach various types of accessories, such as cutting tools, saw blades, and sanding tools, to the output shaft. Different brands of oscillating power tools tend to have different, often proprietary, accessory attachment mechanisms. It is desirable to have oscillating accessories with a universal attachment portion that can be attached to a multitude of different brands of oscillating power tools.

For example, FIGS. 1-6 show examples of various proprietary accessory components that extend from a power tool and that each includes a plurality of projections as described in U.S. Pat. No. 8,915,499, which is incorporated by reference herein. The example accessory components illustrated in FIGS. 1-6 are of those sold under the TRADE-NAMES of Fein® (FIG. 1), Craftsman® (FIG. 2), Porter-Cable® (FIG. 3), Dremel®, Bosch®, Milwaukee® and Skil® (FIG. 4), Rigid® (FIG. 5), and Mastercraft® (FIG. 6). FIG. 7 shows a blade 102 that includes a single universal mounting configuration. The mounting configuration is formed of a plurality of slits into which the projections of the accessory components of FIGS. 1-6 are able to project. FIGS. 8-13 show the universal mounting configuration of FIG. 7 in use with respective ones of the accessory components shown in FIGS. 1-6. This is just one example of a single universal mounting configuration, and many others are known in the art. By way of example, FIGS. 14-17 illustrate additional examples of respective single universal mounting configurations that are each already known in the art, implemented on an oscillating blade 102.

FIGS. 18-27 illustrate yet another example of a single universal mounting configuration used on various accessories or tools that have different types of working edges and configurations. For example, FIG. 18 is a top view of another version of a universal mounting configuration with a closed back end, where the configuration is used on a blade 102 having a straight serrated cutting edge 104. FIG. 19 is a side view thereof. FIG. 20 is a top view of the universal mounting configuration of FIG. 18, where the configuration is used on a blade 102 with an arched abrading edge 106 on which there are abrasive particles. FIG. 21 is a side view thereof. FIG. 22 is a top view of the universal mounting configuration of FIG. 18, where the configuration is used on a blade 102 with a slightly arched slicing edge 108. FIG. 23 is a side view thereof. FIG. 24 is a top view of the universal mounting configuration of FIG. 18, where the configuration is used on an oscillating circular saw blade 102, while FIG. 25 shows substantially the same arrangement except where the blade is only partially circular. FIG. 26 is a top view of another blade 102 with a straight serrated cutting edge 104, the width of which is smaller than the blade of FIG. 18, but with the same mounting configuration. FIG. 27 is a top view of the universal mounting configuration of FIG. 18, where the configuration is used on a blade 102 with a curved chipping edge 110.

The closed end of the blades of FIGS. 18-27 does not allow a clamping member to be inserted through the back of the blade, unlike the examples shown in FIGS. 7-17, which have open ends, and more time may therefore be required to assemble the blades of FIGS. 18-27 onto a power tool than the blades of FIGS. 7-17.

SUMMARY

The number of attachment schemes and types of accessories have increased over time and therefore example embodiments of the present invention provide a mounting interface on an accessory, where the mounting interface can be used with as many mounting/attachment schemes and types of accessories as possible.

Example embodiments of the present invention include embodiments related to an apparatus that comprises a blade for oscillating tools, where the apparatus includes lateral edges, a working edge that extends in a first direction, and a mounting portion. The mounting portion includes a first mounting configuration that defines a first center and a second mounting configuration that defines a second center, where the first center is spaced away from the second center a predetermined distance in a direction that is substantially orthogonal to the tangent of the first direction in which the working edge extends, and where the first and second mounting configurations are configured to be mounted to different respective power tools for driving the same working edge. These aspects are presented merely to provide a brief summary of these example embodiments, and these aspects are not intended to limit the scope of this disclosure. Indeed, the present invention may also encompass a variety of other aspects.

These and other features, aspects, and advantages of the present invention will become better understood when the following detailed description of certain exemplary embodiments is read with reference to the accompanying drawings in which like characters represent like arts throughout the drawings.

BRIEF DESCRIPTION OF THE DRAWINGS

FIG. 20 is a top view of the universal mounting configuration of FIG. 18 used on a blade with an arched abrading edge.

FIG. 21 is a side view of the blade of FIG. 20.

FIG. 22 is a top view of the universal mounting configuration of FIG. 18 used on a blade with slightly arched slicing edge.

FIG. 23 is a side view of the blade of FIG. 22.

FIG. 29 is a bottom view showing a mounting configuration arrangement that includes two mounting interfaces or configurations, according to a second example embodiment of the present invention, where the two mounting interfaces or configurations are spaced away from each other a smaller distance than in the embodiment of FIG. 28.

DETAILED DESCRIPTION

One or more specific example embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such development effort might be complex and time consuming, but would nevertheless be a routine undertaking of design, fabrication, and manufacture for those of ordinary skill having the benefit of this disclosure.

Example embodiments of the present invention relate to blades used with oscillating power tools. The term "oscillating" is to be interpreted broadly to mean a back and forth motion in any direction whether it be in the same plane as a working edge, as is often the case when referring to "oscillating tools" in general parlance, or reciprocating in a plane that is perpendicular to the working edge, as is the case when referring to "reciprocating saws" in general parlance. Therefore, embodiments for either type of motion, as well as others, are to be included in the scope of the present invention.

Figure 28:
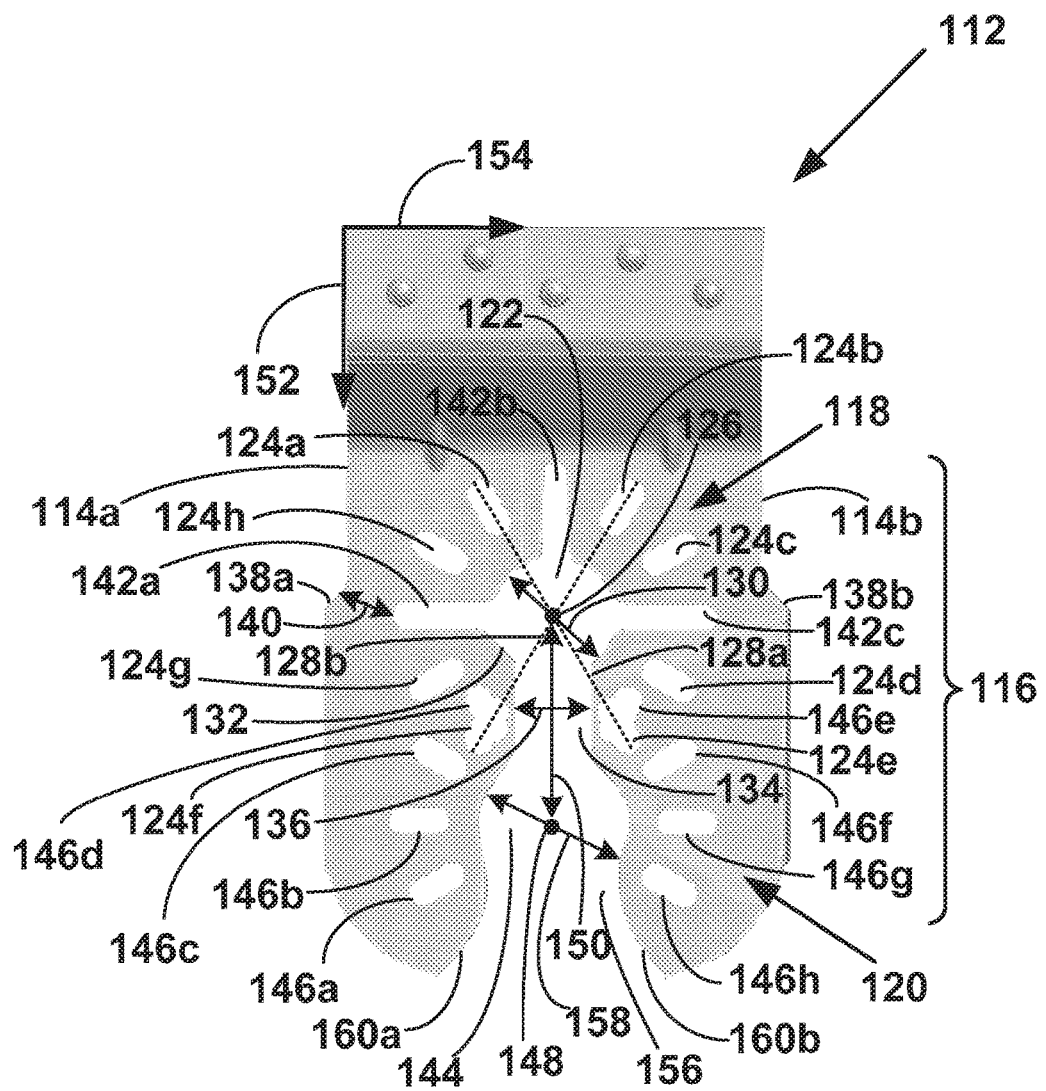
FIG. 28 is a bottom view showing a mounting configuration arrangement that includes two mounting interfaces or configurations spaced away from each other a predetermined distance, according to a first example embodiment of the present invention.

FIG. 28 is a bottom view of an accessory or blade 112 according to a first example embodiment of the present invention. It comprises lateral edges 114a-b and a mounting portion 116, rearward of a working edge, that includes at least two mounting interfaces or configurations 118, 120. The first mounting configuration 118 comprises a central aperture 122 and a plurality of peripheral apertures 124a-h disposed about the central aperture 122. The first mounting configuration 118 defines a center 126. This center may be determined by lines 128a-b of intersection formed by two sets of diametrically opposite peripheral apertures 124a-b. Alternatively, this center may be defined geometrically by the center point of the central aperture 122 itself, for example, it could be the center of the diameter 130 of a circular hole if the central aperture 122 is so constructed. In some cases, the center of the mounting configuration 118 could be determined using some combination of both these methods. Usually, the central aperture 122 will include at least one edge 132 that is configured to be engaged by a clamping member of a mounting mechanism of a power tool. The central aperture 122 of the example embodiment shown in FIG. 28 is a circle having a diameter of approximately 10 mm. This could be varied as desired.

Figure 1:
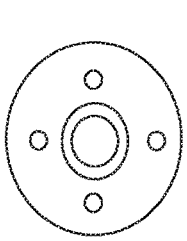
FIG. 1 is a top view of a prior art mounting configuration of a power tool sold under the TRADENAME Fein®, which mounting configuration is used for attaching accessories to the power tool.
Figure 2:
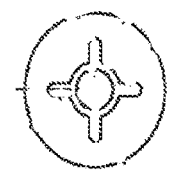
FIG. 2 is a top view of another prior art mounting configuration of a power tool sold under the TRADENAME Craftsman®, which mounting configuration is used for attaching accessories to the power tool.
Figure 3:
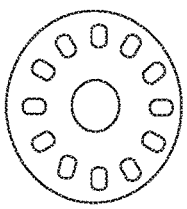
FIG. 3 is a top view of a prior art mounting configuration of a power tool sold under the TRADENAME Porter-Cable®, which mounting configuration is used for attaching accessories to the power tool.
Figure 4:
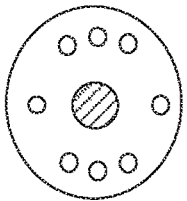
FIG. 4 is a top view of a prior art mounting configuration of a power tool sold under the TRADENAMES of Dremel®, Bosch®, Milwaukee® and Skil®, which mounting configuration is used for attaching accessories to the power tool.
Figure 5:
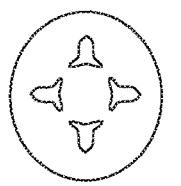
FIG. 5 is a top view of a prior art mounting configuration of a power tool sold under the TRADENAME Ridgid®, which mounting configuration is used for attaching accessories to the power tool.
Figure 6:
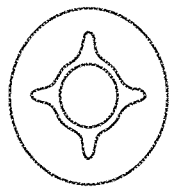
FIG. 6 is a top view of a prior art mounting configuration of a power toll sold under the TRADENAME MasterCraft®, which mounting configuration is used for attaching accessories to the power tool.
Figure 8:
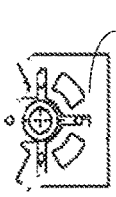
FIG. 8 is a top view of a blade that includes a universal mounting configuration, where the universal mounting configuration mates with the prior art mounting configuration of FIG. 1.
Figure 9:
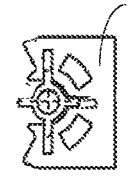
FIG. 9 is a top view of a blade that includes the universal mounting configuration, where the universal mounting configuration mates with the prior art mounting configuration of FIG. 2.

The first mounting configuration 118 illustrated in FIG. 28 is compatible with the mounting configuration of FIG. 4 used by Bosch® or Dremel®. It is contemplated that the first mounting configuration 118 could be any mounting configuration known or that will be devised in the art, including those that are not universal mounting configurations and that only mate with a single power tool mounting mechanism. The central aperture 122 transitions to a further rearward section of the blade 112 via an intermediate slot 134, the width of the intermediate slot 134 being decreased compared to the diameter of the central aperture 122, which is advantageous when trying to mount the blade 112 to the mounting mechanisms of certain power tools known in the art. This reduction in the width of the slot 134 also increases the strength of the blade. For this embodiment, the width 136 of the slot is approximately 6 mm. It is contemplated that the width of the slot could be the same as the diameter of the central aperture in other embodiments. Jogs 138a-b of the lateral edges 114a-b of the blade 112 are also provided to help maintain a minimum wall thickness 140 from a mounting aperture to the edge 114a-b of the blade 112, helping to prevent crack initiation that could lead to blade failure over time. This minimum wall thickness could be 2 mm.

Furthermore, the central aperture 122 has three other slots 142a-c that are configured to accept various drive members of power tools that are located on the right, left and top portions of the central aperture 122 and that open into the central aperture 122.

A second mounting configuration 120 with a central aperture 144 and a plurality of peripheral apertures 146a-h is provided behind the first mounting configuration 118. Like the first mounting configuration 118, the second mounting configuration 120 defines a second center 148. The center 148 of the second mounting configuration 120 is spaced a predetermined distance 150 away from the first center 126 of the first mounting configuration 118 in a direction 152 that is substantially orthogonal to the direction 154 in which the working edge extends (or, in the case of a curved working edge, substantially orthogonal to the tangent of the center of curvature of the working edge). It is noted that for this figure as well as others from this point forward, the working edge is not shown, but the mounting portion may be attached, for example by welding, to a working portion that has a working edge that extends in direction 154 as shown. For this embodiment, this distance can range from 15 to 20 mm. For example, in an example embodiment, it is 17 mm.

As can be seen, the second mounting configuration 120 is compatible with the mounting configurations used by a different power tool manufacturer than that with which the first mounting configuration 118 is compatible. It is contemplated that the first and second mounting configurations could be any mounting configuration known or that will be devised in the art including those that are not universal mounting configurations and that only mate with a single power tool mounting mechanism. Also, in some embodiments, the first mounting configuration is different than the second mounting configuration and, in other embodiments, the first mounting configuration is the same as the second mounting configuration.

Figure 10:
FIG. 10 is a top view of a blade that includes the universal mounting configuration, where the universal mounting configuration mates with the prior art mounting configuration of FIG. 3.
Figure 11:
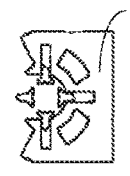
FIG. 11 is a top view of a blade that includes the universal mounting configuration, where the universal mounting configuration mates with the prior art mounting configuration of FIG. 4.
Figure 12:
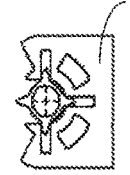
FIG. 12 is a top view of a blade that includes the universal mounting configuration, where the universal mounting configuration mates with the prior art mounting configuration of FIG. 5.
Figure 13:
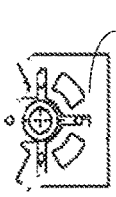
FIG. 13 is a top view of a blade that includes the universal mounting configuration, where the universal mounting configuration mates with the prior art mounting configuration of FIG. 6.
Figure 17:
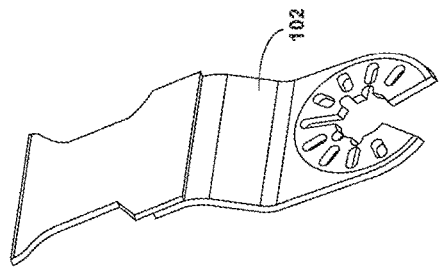
FIG. 17 illustrates an additional respective example of a prior art single universal mounting configuration implemented on an oscillating blade, where the respective universal mounting configuration has an open back end.
Figure 16:
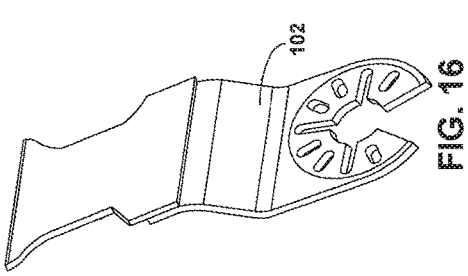
FIG. 16 illustrates an additional respective example of a prior art single universal mounting configuration implemented on an oscillating blade, where the respective universal mounting configuration has an open back end.
Figure 15:
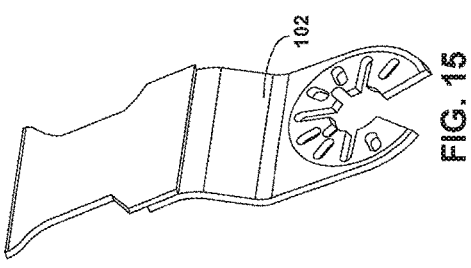
FIG. 15 illustrates an additional respective example of a prior art single universal mounting configuration implemented on an oscillating blade, where the respective universal mounting configuration has an open back end.
Figure 14:
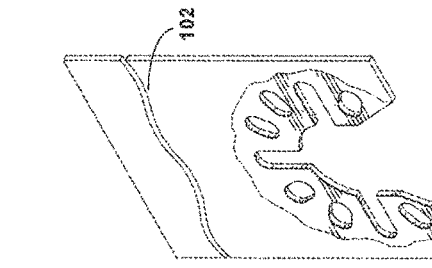
FIG. 14 illustrates an additional respective example of a prior art single universal mounting configuration implemented on an oscillating blade, where the respective universal mounting configuration has an open back end.
Figure 7:
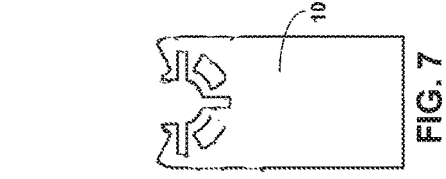
FIG. 7 is a top view of a blade utilizing the universal mounting configuration of FIGS. 8-13, but where the universal mounting configuration is shown in isolation from the mounting pins of the prior art mounting configurations of FIGS. 1-6.
Figure 18:
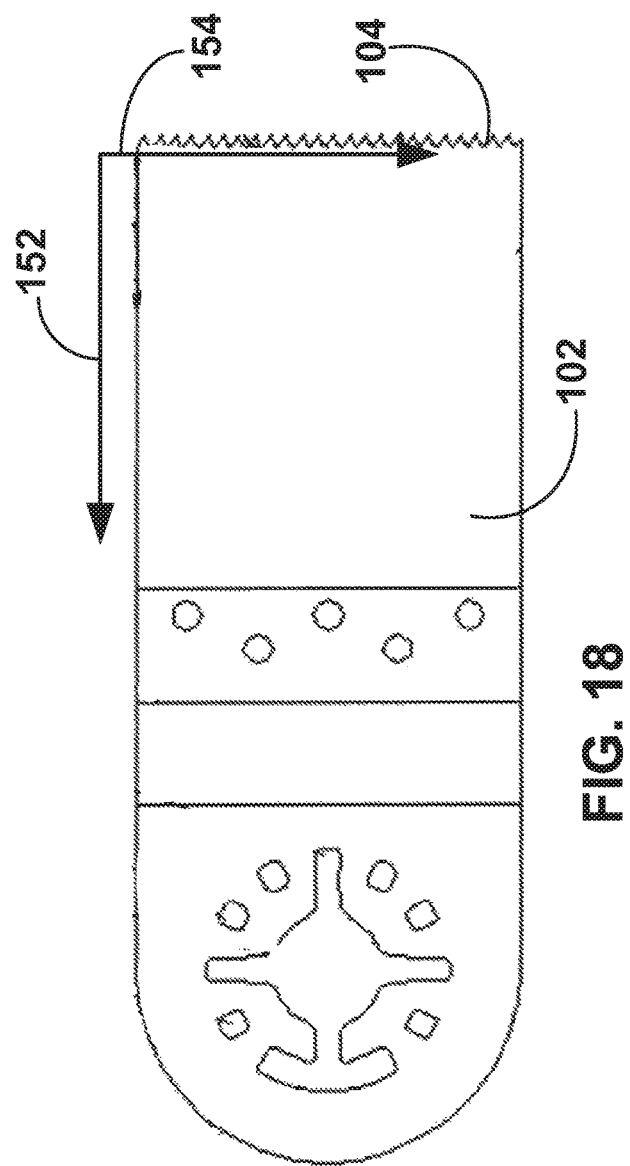
FIG. 18 is a top view of a universal mounting configuration with a closed back end and used on a blade having a straight serrated cutting edge.
Figure 19:
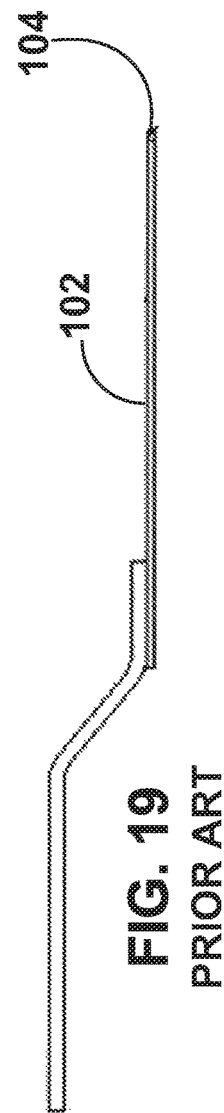
FIG. 19 is a side view of the blade of FIG. 18.
Figure 24:
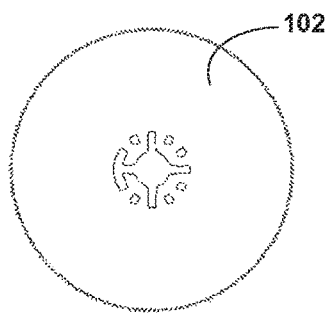
FIG. 24 is a top view of the universal mounting configuration of FIG. 18 used on an oscillating circular saw blade.
Figure 25:
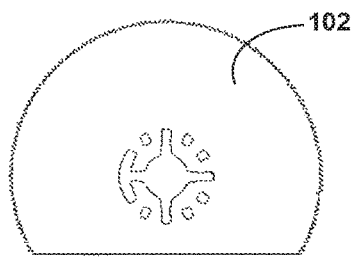
FIG. 25 is a top view of the universal mounting configuration of FIG. 18 used on a partial circular saw blade.
Figure 26:
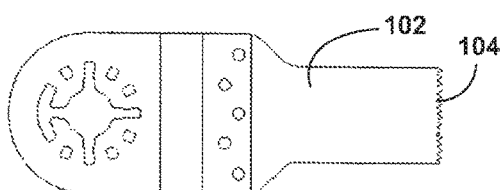
FIG. 26 is a top view of another blade having a straight serrated cutting edge that has a smaller width than the blade of FIG. 18 but has the same mounting configuration as that of FIG. 18.
Figure 27:
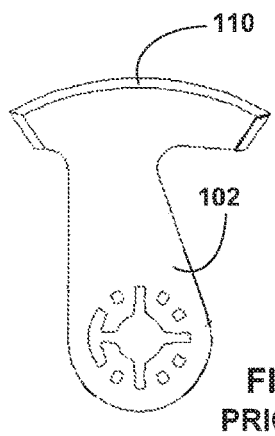
FIG. 27 is a top view of the universal mounting configuration of FIG. 18 used on a blade that has a curved chipping edge.

Returning to the second mounting configuration 120, its central aperture 144, which in this case is a circular hole, transitions to the rear edge of the blade 112 by a slot 156, the width of the slot 156 being decreased compared to the diameter 158 of the central aperture 144, which is advantageous when mounting the blade 112 to the mounting mechanisms of certain power tools known in the art as it allows a clamping member to slide in from the rear. This reduction in the width of the slot 156 also increases the strength of the blade 112. It is contemplated that the width of the slot 156 could be the same as the diameter 158 of the central aperture 144 in other embodiments. Finally, chamfers 160a-b are provided that serve two purposes. First, they provide a lead-in for a clamping screw or member of a power tool that is to be inserted into the slots of the blade 112. Second, they provide surfaces against which projections of a power tool can abut (see, e.g., FIGS. 10 and 11).

In an example embodiment, the diameter 158 for the second configuration 120 is about 12 mm. This could be varied as desired. Also, one set of shared peripheral apertures, including a composition of apertures 124f/146d of FIG. 28 and a composition of apertures 124e/146e of FIG. 28, and which are usable for both of the mounting configurations 118, 120, are positioned near the intermediate slot 134 that communicates between the first and second central apertures 122, 144.

FIG. 29 illustrates a second example embodiment where the first and second mounting configurations 118, 120 are spaced a small distance away from each other. This distance 150 can be in the range of 0.5 to 2 mm, for example, 0.7 mm. This small distance creates several geometrical particularities. First, the edge 164 that defines the first central aperture 122 (which is centrally located with respect to the functioning of the first mounting configuration 118) transitions to another edge 166 that defines the second central aperture 144 (which is centrally located with respect to the functioning of the second mounting configuration 120) forward of the top and bottom slots 142a, 142c that communicate with the central apertures 122, 144. Second, the width of the top and bottom slots 142a, 142c is wider than the slot on the left 142b that communicates with these central apertures 122, 144. Due to this configuration, either a right or left edge of these slots 142a, 142c would be engaged by a protrusion or drive member of a power tool attachment mechanism depending on which power tool is used. Third, the first plurality of peripheral apertures, which in this case includes apertures 124a-f, overlaps the second plurality of peripheral apertures, which in this case includes apertures 146a-f, so that only two sides of any of these apertures would be substantially engaged by the drive members of the power tool attachment mechanism.

The symmetrical arrangement of all these features about the central apertures 122, 144 means that enough surface area is provided in the right directions and places to firmly lock the blade in place and hold it sufficiently when used. The chamfers 160 provide a lead-in and drive function as previously described. It is contemplated that the chamfers 160 can be omitted or could only serve a lead-in function in other example embodiments of the present invention.

Figure 31:
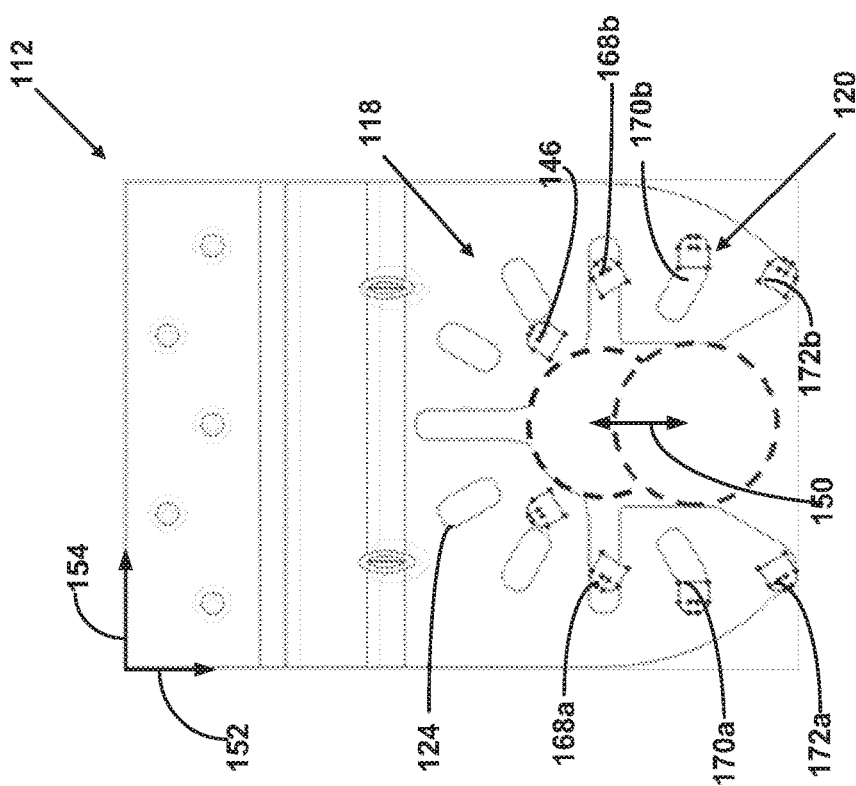
FIG. 31 is another bottom view of the embodiment of FIG. 29, but with the two mounting configurations outlined for illustrative purposes.
Figure 30:
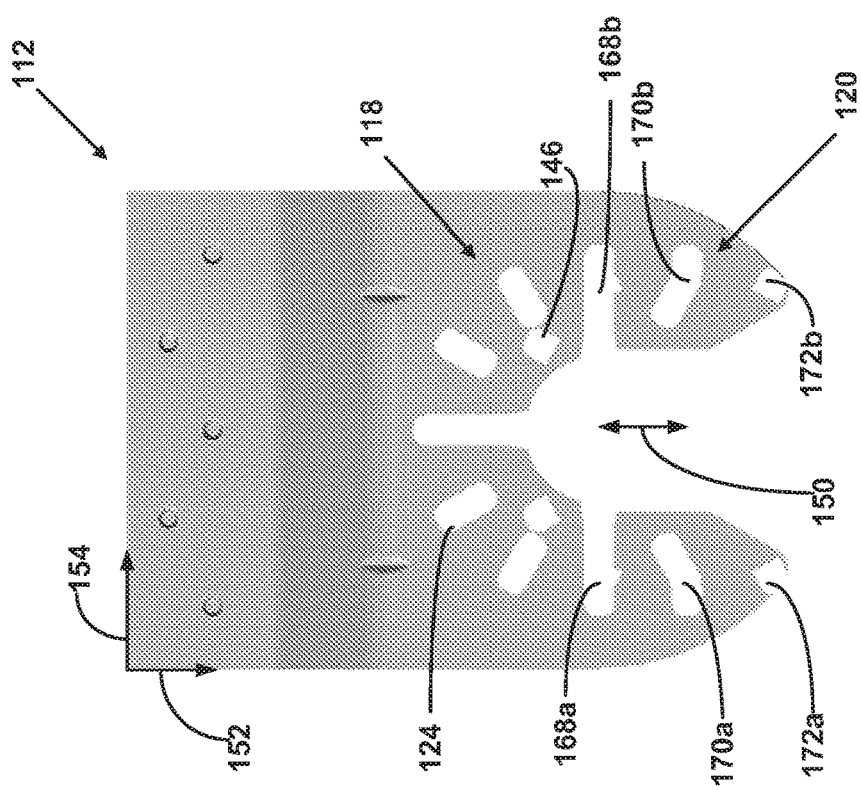
FIG. 30 is a bottom view showing a mounting configuration arrangement that includes two mounting interfaces or configurations, according to a third example embodiment of the present invention, where the two mounting interfaces or configurations are spaced away from each other a smaller distance than in the embodiment of FIG. 28 but a greater distance than in the embodiment of FIG. 29.

FIGS. 30 and 31 show a third example embodiment of a blade 112 where the first mounting configuration 118 is spaced an intermediate distance 150 from the second mounting configuration 120. This distance can range from 7 to 10 mm, for example, approximately 8 mm. For the second mounting configuration 120, the central aperture 144 that would typically be a circle is subsumed by the rearward extending slot 156 whose edges would be theoretically tangential to the second central aperture 144 (see FIG. 31). As can be seen, the first set of peripheral apertures 124 for the first mounting configuration 118 include a substantially oval or rectangular shape while the second set of peripheral apertures 146 for the second mounting configuration 120 include a substantially half oval or rectangle shape as compared to the first set of peripheral apertures 124.

The spacing of the first mounting configuration 118 from the second mounting configuration 120 results in two places 168*a-b* where the peripheral apertures 146 of the second mounting configuration 120 overlap with left and right slots that communicate with the first central aperture 122. This spacing also results in two places 170*a-b* where the peripheral apertures 146 of the second mounting configuration 120 overlap with respective peripheral apertures 124 of the first mounting configuration 118, that is to say at least one pair of peripheral apertures 124 of the first mounting configuration 118 at least partially overlaps with a second pair of peripheral apertures 146 of the second mounting configuration 120. Finally, this spacing results in two places 172*a-b* where the peripheral apertures 146 of the second mounting configuration 120 overlap with an outside edge of the blade.

Figure 33:
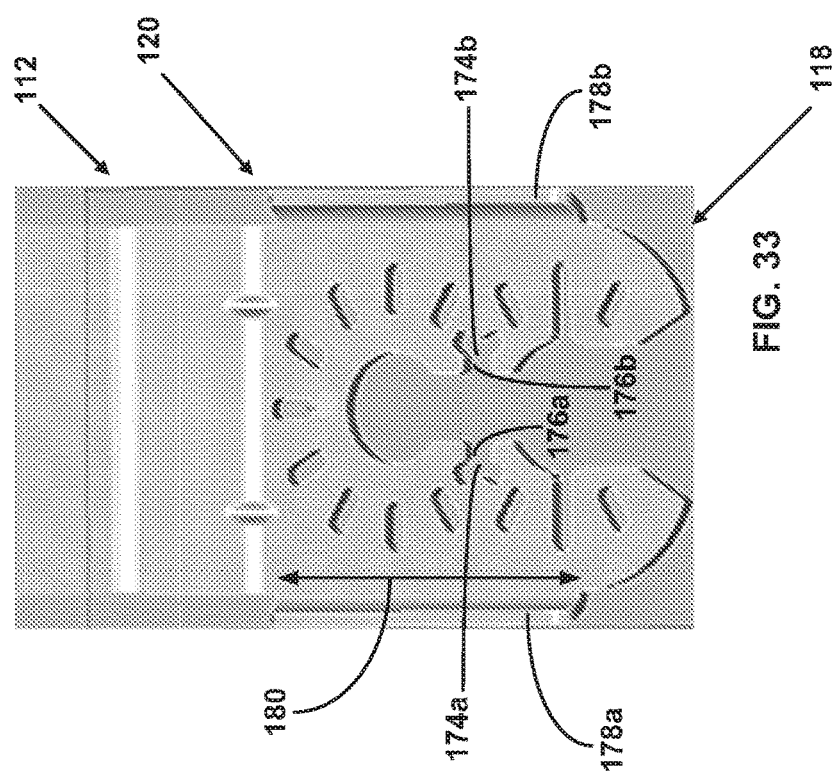
FIG. 33 is a bottom view of the blade of FIG. 32.
Figure 32:
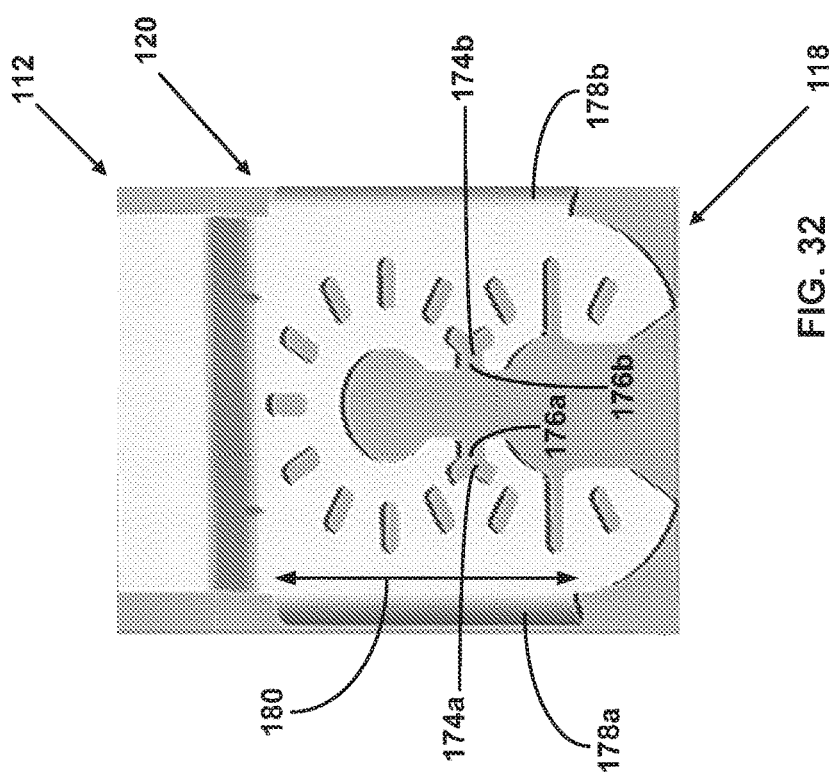
FIG. 32 is a top view of a third example embodiment where, compared to the embodiment of FIG. 28, the positions of the two mounting configurations have been switched.

FIGS. 32 and 33 are top and bottom views of a third example embodiment of a blade 112 where, compared to FIG. 28, the position of the second mounting configuration 120 has been switched with the position of the first mounting configuration 118 so that the first mounting configuration 118 is rearward of the second mounting configuration 120. The spacing of the first and second mounting configurations 118, 120 is about the same as that shown in FIG. 28. This arrangement and spacing results in two places 174*a-b* where the first set of peripheral apertures 124, associated with the first mounting configuration 118, overlaps with the second set of peripheral apertures 146 that are associated with the second mounting configuration 120, thereby forming, at those overlapping locations, respective cross connecting slots 176*a-b* that each opens into the connecting slot between the first and second central apertures 118, 120, to eliminate any thin areas that would break over time in use.

An additional feature is added in the form of strengthening ribs or stiffening flanges 178*a-b* that are positioned along the lateral edges of the blade 112 and that extend downwardly to provide added stiffness to the blade 112. These flanges 178*a-b* also extend rearward a distance 180 from the front of the second mounting configuration 120 past the left and right slots that communicate with the first central aperture 122. That is to say, it extends approximately to or past the first center of the first mounting configuration 118.

None of FIGS. 28-33 show the working portion of the blade 112. Any of the embodiments discussed herein can be used with any blade 112 or work tool configuration that is adapted to be mounted to an oscillating tool or the like including those shown in FIGS. 18-27. The working edge of the blade 112 can be of any suitably appropriate type, for example, a serrated cutting edge, an abrading edge, etc., and the first and second mounting configurations 118, 120 can be disposed a predetermined distance away from the working edge. The working edge typically extends in a first direction and the mounting configuration or configurations extend in a direction that is substantially orthogonal 152 to the first direction 154 or the tangent to the central location of curvature in the case of a curved working edge (see FIGS. 18, 20, 22 and 28 for example). As mentioned previously, the mounting portion of the blade 112 can be attached to a working portion via methods and devices known in the art such as via welding, etc.

Therefore, most of the embodiments described herein include those where the first and second mounting configurations are spaced away from each other in this orthogonal direction (small deviations are envisioned provided that they do not deleteriously affect the inertia and associated performance of the blade as are well known in the art). Also, any embodiment discussed herein can have a circular central aperture for any mounting configuration. The back end can be open to allow the insertion of a clamping member of a power tool for any embodiment or the back end can be closed in other embodiments.

The spacing between the first and second mounting configurations is usually small enough so that they can effectively drive the same working edge. This is contrary to blades known in the art where multiple mounting configurations are provided to drive different working edges, where, typically, each of the two mounting configurations is configured to drive the respective working edge furthest away from it.

The specific embodiments described above have been shown by way of example, and it should be understood that these embodiments may be susceptible to various modifications and alternative forms. For example, the above disclosed embodiments and other features, functions, aspects, or alternatives thereof, may be desirably combined into many other different systems, applications or methods. Various presently unforeseen or unanticipated alternatives, modifications, variations or improvements may be subsequently made by those skilled in the art that are also intended to be encompassed by the present invention. Furthermore, other features and aspects, etc. of certain embodiments may be substituted for or added to other features and aspects, etc. of other embodiments to produce yet further embodiments and are therefore contemplated to be within the scope of the present invention. It should be therefore understood that the claims are not intended to be limited to the particular forms disclosed, but rather to cover all modifications, equivalents, and alternatives falling with the sprit and scope of this disclosure.

What is claimed is:

1. A blade for oscillating tools comprising:
   lateral edges;
   a mounting portion that includes a first mounting configuration that defines a first center and a second mounting configuration that defines a second center, wherein:
   the first and second mounting configurations are configured to mount the blade to different respective power tools for driving a same working edge;
   the first center is spaced a distance away from the second center in a first direction that is orthogonal to a second direction in which the working edge extends or in which a tangent of a center of curvature of the working edge extends;

each of the first and second mounting configurations includes a respective plurality of peripheral apertures arranged around the respective center of the respective mounting configuration; and the first and second mounting configurations overlap so that one or both of the following:

(a) each of the first and second mounting configurations includes a respective central aperture, (b) for each of the first and second mounting configurations, the respective plurality of peripheral apertures of the respective mounting configuration is arranged around a perimeter of the respective central aperture of the respective mounting configuration, (c) each of the peripheral apertures defines a respective shape that has a respective exterior edge and a respective interior area of the respective aperture that is interior of the respective exterior edge of the shape defined by the respective aperture, (d) one of the plurality of peripheral apertures of the first mounting configuration overlaps one of the peripheral apertures of the second mounting configuration so that the overlapping peripheral apertures have within them a shared interior area that is part of the respective interior areas of each of the overlapping apertures, and (e) the overlapping peripheral apertures of the first and second mounting configurations each has, extending along a surface of the blade, a respective length and a respective width that is a different size than the respective width; and the first and second mounting configurations define a common central aperture, the first mounting configuration includes a first edge that is curved and defines the first center within the common central aperture, continual 360° projection of the first curved edge defines an interior of the first mounting configuration that is circumscribed by the projection of the first curved edge, the second mounting configuration includes second and third edges, that are opposite each other and that, by projection of a projected 360° curved edge overlapping with and connecting the second and third edges, define the second center within the common central aperture, the projected 360° curved edge of the second mounting configuration defines an interior of the second mounting configuration that is circumscribed by the projected 360° curved edge of the second mounting configuration, the common central aperture includes a region that is both within the interior defined by the continual 360° projection of the first curved edge and within the interior defined by the projected 360° curved edge of the second mounting configuration, the respective plurality of peripheral apertures of the second mounting configuration are arranged equidistantly around the second center, and the first and second centers are offset from each other; and the working edge.

2. The blade of claim 1, wherein the peripheral apertures of the first mounting configuration define lines of intersection and said first center is defined by the lines of intersection of the peripheral apertures.

3. The blade of claim 1, wherein the first center is defined by the geometry of the respective central aperture of the first mounting configuration.

4. The blade of claim 3, wherein the second center is defined by a geometry of the respective central aperture of the second mounting configuration.

5. The blade of claim 1, wherein the first mounting configuration is further from the working edge than the second mounting configuration.

6. The blade of claim 1, wherein the first and second mounting configurations are geometrically different from each other.

7. The blade of claim 1, wherein the first mounting configuration includes a first hole that defines a first circle.

8. The blade of claim 7, wherein the second mounting configuration includes a second hole that defines a second circle.

9. The blade of claim 1, wherein the first mounting configuration includes a plurality of slots that open into the common central aperture or the respective central aperture of the first mounting configuration.

10. The blade of claim 9, wherein the second mounting configuration is further from the working edge than the first mounting configuration.

11. The blade of claim 9, wherein the first mounting configuration is further from the working edge than the second mounting configuration.

12. The blade of claim 9, wherein at least two of the plurality of peripheral apertures of the second mounting configuration overlap respective ones of the plurality of slots of the first mounting configuration.

13. The blade of claim 1, further comprising:

disposed along at least one of the lateral edges, a respective stiffening flange that curves downward away from a surface in which the first and second mounting configurations are arranged, thereby defining an open concavity.

14. The blade of claim 13, wherein the second mounting configuration is rearward of the first mounting configuration, the first mounting configuration is rearward of the working blade, and the flange extends from the front of the first mounting configuration to approximately the center of the second mounting configuration.

15. The blade of claim 1, wherein the distance is 0.5 to 2.0 mm.

16. The blade of claim 1, wherein the distance is 7 to 10 mm.

17. The blade of claim 1, wherein the distance is 15 to 20 mm.

18. The blade of claim 1, wherein each of the first and second mounting configurations includes the respective central aperture, for each of the first and second mounting configurations, the respective plurality of peripheral apertures of the respective mounting configuration is arranged around the perimeter of the respective central aperture of the respective mounting configuration, each of the peripheral apertures defines the respective shape that has the respective exterior edge and the respective interior area of the respective aperture that is interior of the respective exterior edge of the shape defined by the respective aperture, the one of the plurality of peripheral apertures of the first mounting configuration overlaps the one of the peripheral apertures of the second mounting configuration so that the overlapping peripheral apertures have within them the shared interior area that is part of the respective interior areas of each of the overlapping apertures, and the overlapping peripheral apertures of the first and second mounting configurations each has, extending along the surface of the blade, the respective length and the respective width that is the different size than the respective width.

19. The blade of claim 18, wherein a central longitudinal axis that extends along the length of one of the overlapping peripheral apertures crisscrosses a central longitudinal axis that extends along the length of the other of the overlapping apertures.

20. The blade of claim 1, wherein the first and second mounting configurations define the common central aperture, the first mounting configuration includes the first edge that is curved and defines the first center within the common central aperture, the continual 360° projection of the first curved edge defines the interior of the first mounting configuration that is circumscribed by the projection of the first curved edge, the second mounting configuration includes the second and third edges that are opposite each other and that, by the projection of the projected 360° curved edge overlapping with and connecting the second and third edges, define the second center within the common central aperture, the projected 360° curved edge of the second mounting configuration defines the interior of the second mounting configuration that is circumscribed by the projected 360° curved edge of the second mounting configuration, the common central aperture includes the region that is both within the interior defined by the continual 360° projection of the first curved edge and within the interior defined by the projected 360° curved edge of the second mounting configuration, the respective plurality of peripheral apertures of the second mounting configuration are arranged equidistantly around the second center, and the first and second centers are offset from each other.

21. The blade of claim 20, wherein a first elongated slot extends laterally from the common central aperture in a first direction towards one of the lateral edges, a second elongated slot extends perpendicularly to the first direction and from the common central aperture towards the working edge, and widths of the first and second slots are different.

22. The blade of claim 1, wherein a first elongated slot that opens into an aperture that includes at least one of the first and second centers extends laterally from the aperture in a first direction towards the lateral edges, a second elongated slot that opens into the aperture that includes the at least one of the first and second centers extends perpendicularly to the first direction and from the aperture towards the working edge, and widths of the first and second slots are different.

23. The blade of claim 1, wherein the peripheral apertures of the first mounting configuration are shaped as ovals and the peripheral apertures of the second mounting configuration are shaped as half-ovals.

24. A blade for oscillating tools comprising:
exterior lateral edges;
a mounting portion that includes a first mounting configuration that defines a first center and a second mounting configuration that defines a second center, wherein:
the first and second mounting configurations are configured to mount the blade to different respective power tools for driving a same working edge;
the first center is spaced a distance away from the second center in a first direction that is orthogonal to a second direction in which the working edge extends or in which a tangent of a center of curvature of the working edge extends;
at least one of the exterior lateral edges is stepped to maintain a minimum wall thickness between the at least one exterior lateral edge and the first mounting configuration, so that, at a first region of the blade, the at least one exterior lateral edge extends in the first direction at a first distance from a central longitudinal axis of the blade that extends in the first direction and, at a second region of the blade, the at least one exterior lateral edge extends in the first direction at a second distance from the central longitudinal axis, the second distance being greater than the first distance; and
one or more apertures of the first mounting configuration is within or extends into the first region of the blade; and
the working edge.

25. The blade of claim 24, wherein the at least one of the exterior lateral edges includes two opposite ones of the exterior lateral edges, each of the two opposite ones of the exterior lateral edges being stepped in opposite directions.

26. A blade for oscillating tools comprising:
lateral edges;
a mounting portion that includes a first mounting configuration that defines a first center and a second mounting configuration that defines a second center, wherein:
the first and second mounting configurations are configured to mount the blade to different respective power tools for driving a same working edge;
the first center is spaced a distance away from the second center in a first direction that is orthogonal to a second direction in which the working edge extends or in which a tangent of a center of curvature of the working edge extends;
the first and second mounting configurations overlap so that each of the first and second mounting configurations includes a respective central aperture and a respective plurality of peripheral apertures arranged around a perimeter of the respective central aperture, one of the plurality of peripheral apertures of the first mounting configuration overlaps one of the peripheral apertures of the second mounting configuration so that the overlapping peripheral apertures have a shared interior area within them, and the overlapping peripheral apertures of the first and second mounting configurations each has a respective longitudinal axis extending along a surface of the blade; and
each of the overlapping peripheral apertures includes a respective long edge extending towards the respective central aperture of the respective mounting configuration and bounded by a respective radially exterior short edge of the respective peripheral aperture and by a respective radially interior short edge of the respective peripheral aperture, the radially exterior short edge of the overlapping peripheral aperture of the first mounting configuration is more radially exterior than the radially exterior short edge of the overlapping peripheral aperture of the second mounting configuration, and the radially interior short edge of the overlapping peripheral aperture of the second mounting configuration is more radially interior than the radially interior short edge of the overlapping peripheral aperture of the first mounting configuration; and
the working edge.

27. A blade for oscillating tools comprising:
lateral edges;
a mounting portion that includes a first mounting configuration that defines a first center and a second mounting configuration that defines a second center, wherein:

the first and second mounting configurations are configured to mount the blade to different respective power tools for driving a same working edge;

the first center is spaced a distance away from the second center in a first direction that is orthogonal to a second direction in which the working edge extends or in which a tangent of a center of curvature of the working edge extends;

the first and second mounting configurations overlap so that each of the first and second mounting configurations includes a respective central aperture and a respective plurality of peripheral apertures arranged around a perimeter of the respective central aperture, one of the plurality of peripheral apertures of the first mounting configuration overlaps one of the peripheral apertures of the second mounting configuration so that the overlapping peripheral apertures have a shared interior area within them, and the overlapping peripheral apertures of the first and second mounting configurations each has a respective longitudinal axis extending along a surface of the blade; and the overlapping peripheral aperture of the first mounting configuration is a slot that opens into the central aperture of the first mounting configuration; and the working edge.

* * * * *